United States Patent Office 3,512,751
Patented May 19, 1970

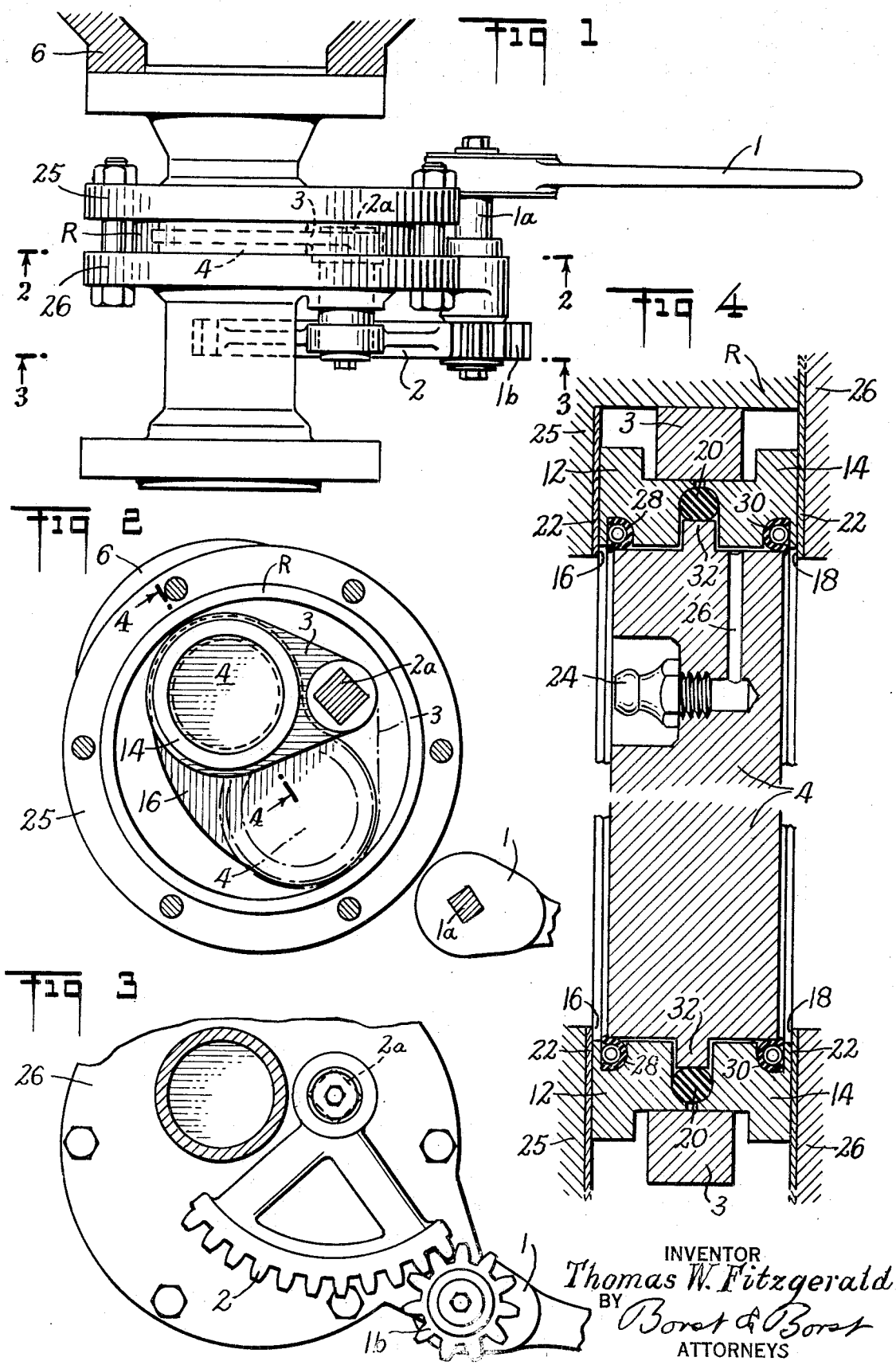

---

3,512,751
SHEARING VALVE ASSEMBLY
Thomas W. Fitzgerald, Westfield, N.J., assignor to
Everlasting Valve Company, Cranford, N.J., a
corporation of New Jersey
Filed Aug. 20, 1968, Ser. No. 754,035
Int. Cl. F16k *1/16, 3/10*
U.S. Cl. 251—302                                    3 Claims

ABSTRACT OF THE DISCLOSURE

The application discloses a valve assembly having a single shut-off disc. Opposing sealing rings are peripherally mounted on the disc to engage opposite seat faces. Primary sealing pressure is oppositely exerted against the rings by a flexible annulus. A secondary sealing force is adapted to be exerted by a projection of the disc itself against one of the rings. The disc and rings are appropriately sealed and the voids between them are filled with a packing material.

---

This invention relates to shut-off valves of the rotating disc type which provide sealing tightness in opposing directions against parallel seat faces.

The improved valve, which is the subject of the present invention is principally characterized by its capacity to provide a shearing action on opening so as to dislodge foreign ingredients that have been forced under pressure between the shearing faces of the valve disc and those of the seat against which it bears. According to the present invention the valve comprises a single disc enveloped by a pair of sealing rings which are caused to exert pressure in opposite directions against the opposing faces which constitute the valve seat. The opposing pressure on the rings is primarily effected by a flexible annulus which impinges equally on both rings. O rings are provided to seal the voids between the disc and the rings, the voids being filled with powderized Teflon to prevent foreign material from lodging therein.

The valve assembly has special utility in the coffee making industry and particularly in the extractor lines in which carbonized coffee materials are removed for deposit at a remote location. Such materials are sufficiently hard as to gall the valve contacting surfaces if the materials can be forced therebetween caused by the high pressure exerted thereon in the lines.

One object of the invention is to provide an improved shearing valve which provides under a range of expected pressures a leak proof valve assembly.

Another object of the invention is to provide a single disc, shearing valve which has means for improved sealing at the valve seat whereby the operative longevity of the valve is enhanced.

Other objects and advantages of the invention may be appreciated on reading the following description of one embodiment thereof which is taken in conjunction with the drawings in which:

FIG. 1 is a view in elevation of the improved valve assembly;
FIG. 2 is a section taken on the line 2—2 of FIG. 1;
FIG. 3 is a section taken on line 3—3 of FIG. 1; and
FIG. 4 is a section taken on line 4—4 of FIG. 2.

Referring to the drawings wrench 1 is mounted on square shaft 1a to turn pinion 1b in engagement with segmental gear 2. Square shaft 2a is located at the axial center of the gear 2 and when turned serves to pivot yoke 3 and disc 4 from one side of upstanding ring R, shown in closed position in FIG. 2, to its open position shown in dotted line in the figure. The disc 4 is swung between the shearing faces of bolted flanges 25 and 26.

Referring to FIG. 4, the valve assembly includes a single disc 4 in shut-off position in the extractor line 6. Peripherally mounted on the disc 4 are opposed sealing rings 12 and 14 which are forced against seats 16 and 18, respectively, by flexible annulus 20, the seats have a colmonoy facing 22 and the rings themselves are of stainless steel.

The voids defined by the edge of the disc and the rings are filled with sealing Teflon, not shown, introduced through grease fitting 24, normally plugged as shown, and channel 26. The voids are capped by O rings 28 and 30 to prevent loss of the Teflon as well as preclude the admission of particles therein.

The disc is provided with an annular projection 32 which is seated on the ring 14 so as to provide a secondary sealing pressure against the seat 18 when the disc is placed under pressure within the extractor line. However, in operation the primary seal is provided between the seat 16 and the ring 12 which is caused by upward pressure exerted by the flexible annulus 20. This prevents particles such as carbonized coffee material, from lodging between the ring 12 and the colmonoy facing 22 for the seat 16 and what little material may seep between the surfaces under high pressure is easily dislodged due to the shearing action of the valve on opening.

Various modifications of the invention may be effected by persons skilled in the art without departing from the scope and principle thereof as defined in the appended claims.

What is claimed is:
1. In a valve assembly including a disc disposed at the valve seat, at least two sealing rings peripherally mounted on the disc and adapted to engage opposing seat faces and a flexible annulus disposed between the rings and adapted to exert opposing forces thereon, voids formed by the edges of said disc and said sealing rings and means are provided in said disc and in communication with said voids for introducing a packing material therein.
2. In a valve assembly as defined in claim 1, wherein said voids are capped by O rings disposed between said disc and said rings.
3. In a valve assembly as defined in claim 2, wherein said disc has a peripheral projection engaging at least one of said rings so as to provide a secondary sealing force on its corresponding seat when said disc is under line pressure.

References Cited

UNITED STATES PATENTS

| 3,305,208 | 2/1967  | Bredtschneider | 251—327 X |
| 3,347,261 | 10/1967 | Yancey         | 137—246.22 X |

FOREIGN PATENTS

| 520,744 | 7/1953 | Belgium. |
| 508,356 | 9/1947 | Canada. |
| 688,941 | 3/1953 | Great Britain. |

HENRY T. KLINKSIEK, Primary Examiner

M. O. STURM, Assistant Examiner

U.S. Cl. X.R.

137—246.22; 251—178